(12) United States Patent
Man et al.

(10) Patent No.: US 11,507,158 B2
(45) Date of Patent: Nov. 22, 2022

(54) ELECTRICAL DESIGN CURRENT THROTTLING

(71) Applicants: ADVANCED MICRO DEVICES, INC., Santa Clara, CA (US); ATI TECHNOLOGIES ULC, Markham (CA)

(72) Inventors: Xiuting Kaleen Cheng Man, Austin, TX (US); Erik Swanson, Fort Collins, CO (US); Larry D. Hewitt, Austin, TX (US); Adam N. C. Clark, Markham (CA)

(73) Assignees: ADVANCED MICRO DEVICES, INC., Santa Clara, CA (US); ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 16/872,602

(22) Filed: May 12, 2020

(65) Prior Publication Data

US 2021/0004068 A1    Jan. 7, 2021

Related U.S. Application Data

(60) Provisional application No. 62/870,391, filed on Jul. 3, 2019.

(51) Int. Cl.
    *G06F 1/26*    (2006.01)

(52) U.S. Cl.
    CPC .................................. *G06F 1/26* (2013.01)

(58) Field of Classification Search
    CPC .................................................... G06F 1/26
    USPC ...................................................... 713/300
    See application file for complete search history.

(56) References Cited

U.S. PATENT DOCUMENTS

| | | | |
|---|---|---|---|
| 2008/0178019 A1* | 7/2008 | McGrane | G06F 1/26 713/320 |
| 2009/0199190 A1* | 8/2009 | Chen | G06F 9/383 718/102 |
| 2012/0159123 A1* | 6/2012 | Naffziger | G06F 1/3243 712/37 |
| 2016/0070327 A1* | 3/2016 | Nemani | G06F 1/3206 713/300 |
| 2016/0240193 A1* | 8/2016 | Gulati | G10L 15/28 |
| 2017/0085084 A1* | 3/2017 | Daly | H02J 3/00 |
| 2019/0041971 A1* | 2/2019 | Ananthakrishnan | G06F 1/28 |
| 2019/0377395 A1* | 12/2019 | Kaburlasos | G06F 1/3206 |

* cited by examiner

*Primary Examiner* — Suresh Suryawanshi

(57) ABSTRACT

Electrical design current throttling, including: applying an electrical design current (EDC) threshold for each control processing unit component of a plurality of the central processing unit components responsive to the corresponding priority of each central processing unit component, the priority of a central processing unit component responsive to a central processing unit component's current usage data.

21 Claims, 5 Drawing Sheets

ELECTRICAL DESIGN CURRENT THROTTLING

CROSS-REFERENCE TO RELATED APPLICATION

This application claims benefit of U.S. Provisional Application Ser. No. 62/870,391, filed Jul. 3, 2019, which is hereby incorporated by reference in its entirety.

BACKGROUND

Voltage regulators of computing devices enforce an electrical design current (EDC) limit defining a maximum amount of current that can be drawn within a short time window (e.g., 1-4 ms). When this limit is reached, the voltage regulator implements overcurrent protection to reduce the drawn current, including stalling or deactivating one or more components. This results in a decrease in computer performance.

DETAILED DESCRIPTION

Figure 1:
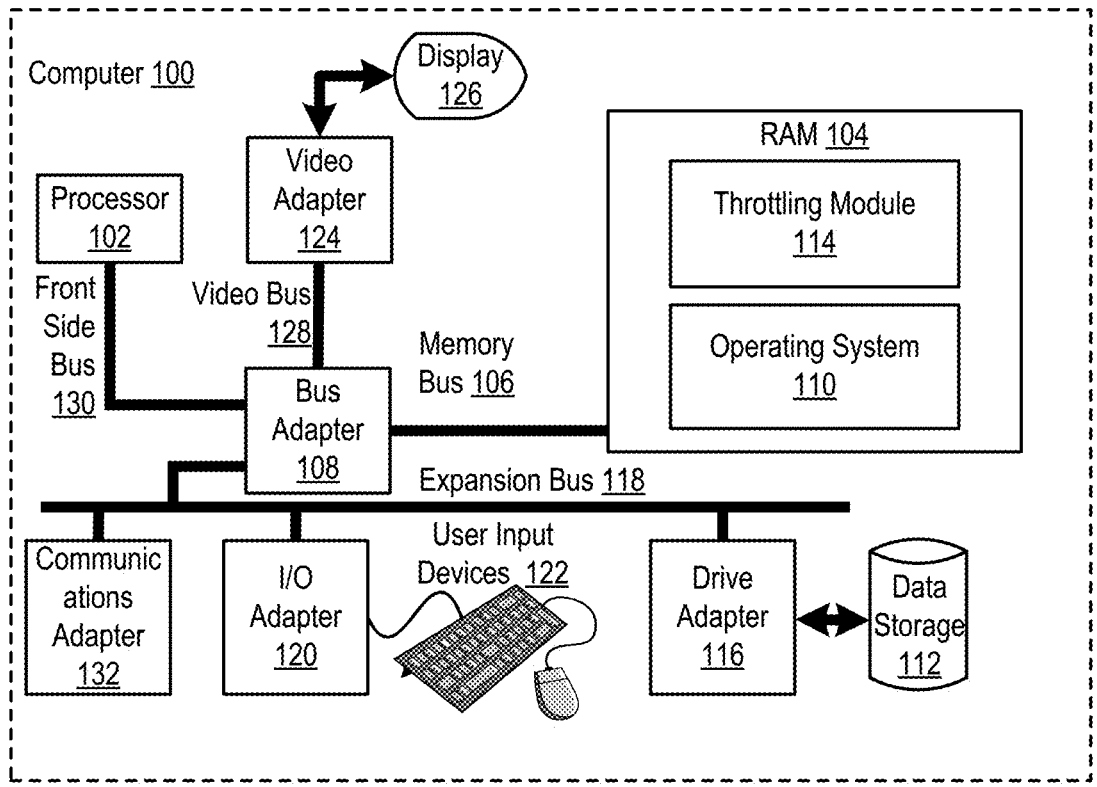
FIG. 1 is a block diagram of an example processor for electrical design current throttling according to some embodiments.

In some embodiments, a method of electrical design current throttling includes: generating current usage data for a plurality of central processing unit components; determining, based on the current usage data, a corresponding priority for each central processing unit component of the plurality of central processing unit components; determining, based on the corresponding priority for each central processing unit component and an electrical design current (EDC) limit for the central processing unit, a corresponding electrical design current threshold for each central processing unit component of the plurality of central processing unit components; and applying the corresponding electrical design current (EDC) threshold for each central processing unit component of the plurality of central processing unit components.

In some embodiments, generating the current usage data includes receiving, from a plurality of counters coupled to the plurality of central processing unit components, a plurality of values. In some embodiments, the current usage data includes, for each central processing unit component, a current consumption value for a time window and an electrical design currency throttling value for the time window. In some embodiments, determining the corresponding priority for each central processing unit of the plurality of central processing unit components includes applying a plurality of weights to a plurality of values in the current usage data. In some embodiments, each weight of the plurality of weights is based on a type of central processing unit component associated with a corresponding value of the plurality of values and/or an executed operation associated with the corresponding value of the plurality of values. In some embodiments, determining the corresponding electrical design current threshold for each central processing unit component includes determining, for each central processing unit component, as the corresponding electrical design current threshold, a portion of the electrical design current limit proportional to a ratio of the corresponding priority to a total priority for the plurality of central processing unit component. In some embodiments, the plurality of central processing unit components include one or more cores of the central processing unit, one or more caches of the central processing unit, and/or one or more core complexes of the central processing unit.

In some embodiments, an apparatus for electrical design current throttling performs steps including: generating current usage data for a plurality of central processing unit components; determining, based on the current usage data, a corresponding priority for each central processing unit component of the plurality of central processing unit components; determining, based on the corresponding priority for each central processing unit component and an electrical design current (EDC) limit for the central processing unit, a corresponding electrical design current threshold for each central processing unit component of the plurality of central processing unit components; and applying the corresponding electrical design current (EDC) threshold for each central processing unit component of the plurality of central processing unit components.

In some embodiments, generating the current usage data includes receiving, from a plurality of counters coupled to the plurality of central processing unit components, a plurality of values. In some embodiments, the current usage data includes, for each central processing unit component, a current consumption value for a time window and an electrical design currency throttling value for the time window. In some embodiments, determining the corresponding priority for each central processing unit of the plurality of central processing unit components includes applying a plurality of weights to a plurality of values in the current usage data. In some embodiments, each weight of the plurality of weights is based on a type of central processing unit component associated with a corresponding value of the plurality of values and/or an executed operation associated with the corresponding value of the plurality of values. In some embodiments, determining the corresponding electrical design current threshold for each central processing unit component includes determining, for each central processing unit component, as the corresponding electrical design current threshold, a portion of the electrical design current limit proportional to a ratio of the corresponding priority to a total priority for the plurality of central processing unit component. In some embodiments, the plurality of central processing unit components include one or more cores of the central processing unit, one or more caches of the central processing unit, and/or one or more core complexes of the central processing unit.

In some embodiments, a computer program product disposed upon a non-transitory computer readable medium includes computer program instructions for electrical design current throttling that, when executed, cause a computer system to perform steps including: generating current usage data for a plurality of central processing unit components; determining, based on the current usage data, a corresponding priority for each central processing unit component of the plurality of central processing unit components; determining, based on the corresponding priority for each central processing unit component and an electrical design current (EDC) limit for the central processing unit, a corresponding electrical design current threshold for each central processing unit component of the plurality of central processing unit components; and applying the corresponding electrical design current (EDC) threshold for each central processing unit component of the plurality of central processing unit components.

In some embodiments, generating the current usage data includes receiving, from a plurality of counters coupled to the plurality of central processing unit components, a plurality of values. In some embodiments, the current usage data includes, for each central processing unit component, a current consumption value for a time window and an electrical design currency throttling value for the time window. In some embodiments, determining the corresponding priority for each central processing unit of the plurality of central processing unit components includes applying a plurality of weights to a plurality of values in the current usage data. In some embodiments, each weight of the plurality of weights is based on a type of central processing unit component associated with a corresponding value of the plurality of values and/or an executed operation associated with the corresponding value of the plurality of values. In some embodiments, determining the corresponding electrical design current threshold for each central processing unit component includes determining, for each central processing unit component, as the corresponding electrical design current threshold, a portion of the electrical design current limit proportional to a ratio of the corresponding priority to a total priority for the plurality of central processing unit component.

Electrical design current throttling accordance with the present application is generally implemented with computers, that is, with automated computing machinery. For further explanation, therefore, FIG. 1 sets forth a block diagram of automated computing machinery including an exemplary computer 100 configured for electrical design current throttling according to certain embodiments. The computer 100 of FIG. 1 includes at least one computer processor 102 or 'CPU' as well as random access memory 104 (RAM') which is connected through a high speed memory bus 106 and bus adapter 108 to processor 102 and to other components of the computer 100.

Stored in RAM 104 is an operating system 110. Operating systems useful in computers configured for electrical design current throttling according to certain embodiments include UNIX™, Linux™, Microsoft Windows™, and others as will occur to those of skill in the art. The operating system 110 in the example of FIG. 1 is shown in RAM 104, but many components of such software typically are stored in non-volatile memory also, such as, for example, on data storage 112, such as a disk drive. Also stored in RAM is the throttling module 114 a module for electrical design current throttling according to certain embodiments.

The computer 100 of FIG. 1 includes disk drive adapter 116 coupled through expansion bus 118 and bus adapter 108 to processor 102 and other components of the computer 100. Disk drive adapter 116 connects non-volatile data storage to the computer 100 in the form of data storage 112. Disk drive adapters useful in computers configured for electrical design current throttling according to certain embodiments include Integrated Drive Electronics ('IDE') adapters, Small Computer System Interface (SCSI') adapters, and others as will occur to those of skill in the art. In some embodiments, non-volatile computer memory is implemented as an optical disk drive, electrically erasable programmable read-only memory (so-called 'EEPROM' or 'Flash' memory), RAM drives, and so on, as will occur to those of skill in the art.

The example computer 100 of FIG. 1 includes one or more input/output ('I/O') adapters 120. I/O adapters implement user-oriented input/output through, for example, software drivers and computer hardware for controlling output to display devices such as computer display screens, as well as user input from user input devices 122 such as keyboards and mice. The example computer 100 of FIG. 1 includes a video adapter 124, which is an example of an I/O adapter specially designed for graphic output to a display device 126 such as a display screen or computer monitor. Video adapter 124 is connected to processor 102 through a high speed video bus 128, bus adapter 108, and the front side bus 130, which is also a high speed bus.

The exemplary computer 100 of FIG. 1 includes a communications adapter 132 for data communications with other computers and for data communications with a data communications network. Such data communications are carried out serially through RS-232 connections, through external buses such as a Universal Serial Bus ('USB'), through data communications networks such as IP data communications networks, and/or in other ways as will occur to those of skill in the art. Communications adapters implement the hardware level of data communications through which one computer sends data communications to another computer, directly or through a data communications network. Examples of communications adapters useful in computers configured for electrical design current throttling according to certain embodiments include modems for wired dial-up communications, Ethernet (IEEE 802.3) adapters for wired data communications, and 802.11 adapters for wireless data communications.

Figure 2:
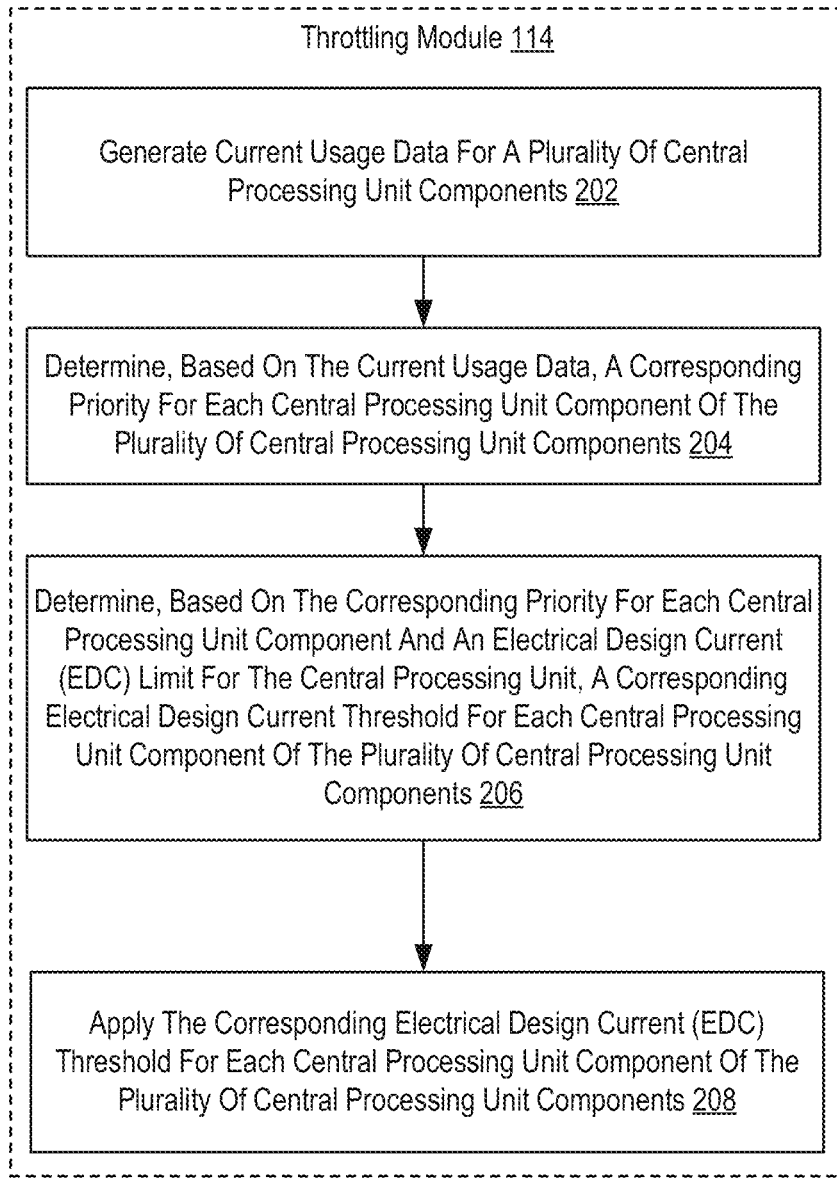
FIG. 2 is a flowchart of an example method for electrical design current throttling according to some embodiments.

For further explanation, FIG. 2 sets forth a flow chart illustrating an exemplary method for electrical design current throttling that includes generating 202 (e.g., by a throttling module 114) current usage data for a plurality of central processing unit components. The throttling module 114 is implemented by one or more software modules (e.g., firmware and/or other types of software) and/or one or more hardware components (e.g., components affixed to or in communication with a central processing unit (CPU). For example, in an embodiment, the throttling module 114 includes one or more firmware agents of the central processing unit. In an embodiment, generating 202 the current usage data includes receiving the current usage data from one or more hardware components and/or one or more firmware agents. In another embodiment, generating 202 the current usage data includes generating 202 the current usage data based on data received from one or more hardware components and/or one or more firmware agents.

The plurality of central processing unit components each includes one or more cores of the central processing unit, one or more caches (e.g., L2 and/or L3 cache) of the central processing unit, and/or one or more core complexes of the central processing unit. The current usage data describes electrical current usage of the central processing unit components on a per-component basis within a time window or based on a recent usage reading. In some embodiments, the current usage data indicates, for each component, a number of times that a particular operation was performed with respect to that component. As an example, the current usage data indicates, for a particular core, a number of times a multiplication operation was issued by the core, a number of times a division operation was issued by the particular core, a number of times the particular core missed a cache read, etc. As another example, the current usage data indicates, for a particular cache, a number of times the particular cache was read from, a number of times the particular cache was written to, a number of times a tag was looked up in the particular cache, etc.

In some embodiments, the current usage data indicates, for each component, a number of times that a particular component met an electrical design current (EDC) threshold for that component. Electrical design current (EDC) is the maximum amount of current that a motherboard's voltage regulator can deliver within a short time window (e.g., 1-4 ms). Accordingly, an electrical design current (EDC) threshold indicates, for a particular component, a maximum amount of current that the particular component is allowed to draw. Accordingly, the current usage data indicates how many times the particular component hit or reached its corresponding electrical design current threshold within the time window. In some embodiments, the current usage data indicates whether a particular core was idle during the time window.

The method of FIG. 2 also includes determining 204 (e.g., by the throttling module 114), based on the current usage data, a corresponding priority for each central processing unit of the central processing unit components. In some embodiments, the priority for a given central processing unit component includes a weighted sum of each value in the current usage data for that component. For example, in some embodiments, the priority for a particular central processing unit component includes a sum of the weighted number of times the component performed each operation indicated in the current usage data and a weighted number of times the component meet its electrical design current threshold.

Accordingly, in some embodiments, determining a priority for a given component includes applying a plurality of weights to a plurality of values associated with the component. In some embodiments, the plurality of weights are defined on a per-component, per-operation basis. In other words, each operation that can be indicated for each type of component includes a different weight. For example, for a cache component, cache reads are associated with a first weight, cache writes are associated with a second weight, etc. As another example, for a core component, each type of instruction issued by the core and indicated in the current usage data corresponds to a different weight. In some embodiments, for weights applied to values indicating the number of times a particular component reaches its electrical design current threshold, each weight differs on a per-component basis. For example, the number of times a core reaches its electrical design current threshold is associated with a first threshold, the number of times an L2 cache reaches its electrical design current threshold is associated with a second threshold, the number of times an L3 cache reaches its electrical design current threshold is associated with a third threshold, etc.

The method of FIG. 2 also includes determining 206 (e.g., by the throttling module 114), based on the corresponding priority for each central processing unit component and an electrical design current limit for the central processing unit, a corresponding electrical design current threshold for each central processing unit component of the plurality of central processing unit components. As is set forth above, an electrical design current threshold for a given component is a limit to how much current that can be drawn by the given component. The electrical design current limit is the fixed total limit of current that can be provided to the central processing unit by the voltage regulator during a fixed time window.

In some embodiments, the determined electrical design current threshold for a given component is a portion of the electrical design current limit proportional a ratio of the priority of the given component and a total priority for all components. The total priority is determined as a sum of all priorities for all components. For example, assume that, for a given component, the ratio of the priority of the given component to the total priority is 0.25. In other words, assuming a total priority indicated as "total_priority," the ratio for the given component is (priority/total_priority) =0.25. Assuming an electrical design current limit "edc_limit," the electrical design current threshold for the given component is then determined as 0.25*edc_limit. Thus, each component is allocated a proportional portion of the total electrical design current limit based on the workload of that component (indicated by the number and type of operations performed by that component) and the sufficiency of the previously determined electrical design current threshold (indicated by the number of times the component reached its electrical design current threshold). Where a particular core is idle (e.g., indicated as idle in the current usage data), the electrical design current threshold is determined as a predefined (e.g., low relative to other thresholds) threshold.

The method of FIG. 2 also includes applying 208 the corresponding electrical design current threshold for each central processing unit component of the plurality of central processing unit components. In some embodiments, each determined electrical design current threshold is provided to an agent or hardware component that applies and enforces the electrical design current thresholds. For example, where a particular component reaches or exceeds its electrical design current threshold, one or more hardware and/or software components cause the particular component to idle or delay for one or more cycles in order to reduce the current drawn by the particular component. One skilled in the art would appreciate that the method of FIG. 2 is repeated at a predefined time window interval such that electrical design currents are adjusted based the most recently monitored workloads of the plurality of central processing unit components.

For further explanation, FIG. 2 sets forth a flow chart illustrating an exemplary method for electrical design current throttling that includes generating 202 (e.g., by a throttling module 114) current usage data for a plurality of central processing unit components; determining 204 (e.g., by the throttling module 114), based on the current usage data, a corresponding priority for each central processing unit of the central processing unit components; determining 206 (e.g., by the throttling module 114), based on the corresponding priority for each central processing unit component and an electrical design current limit for the central processing unit, a corresponding electrical design current threshold for each central processing unit component of the plurality of central processing unit components; and applying 208 the corresponding electrical design current threshold for each central processing unit component of the plurality of central processing unit components.

Figure 3:
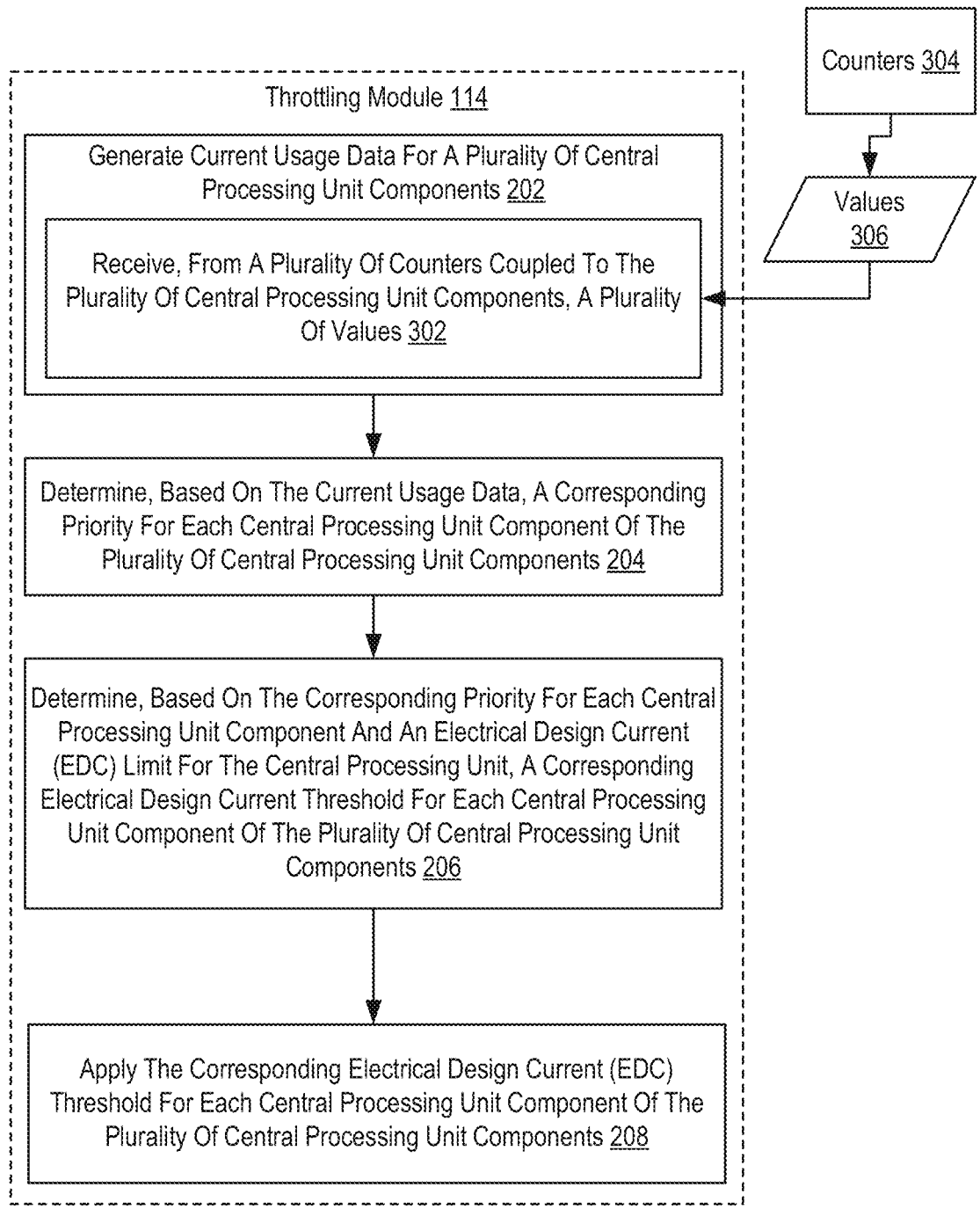
FIG. 3 is a flowchart of an example method for electrical design current throttling according to some embodiments.

FIG. 3 differs from FIG. 2 in that generating 202 current usage data for a plurality of central processing unit components includes receiving 302 (e.g., by the throttling module), from a plurality of counters 304 coupled to the plurality of central processing unit components, a particular of values. In some embodiments, the plurality of counters 304 include one or more microcontrollers coupled to (e.g., tapping) a bus coupled to a corresponding component. The counters 304 are configured to increment a particular value 306 based on operations performed by the corresponding component as indicated by activity on the bus. For example, a counter 304 for a particular core component increments a plurality of values 306 corresponding to a plurality of operations performable by the core component within a time window. Accordingly, the counters 304 are configured to reset each time window in order to track the values 306 for the next time window. Thus, the values 306 tracked during a given time window are provided to the throttling module 114 for use in determining electrical design currents in a next time window. The provided values 306 may then be included in the generated 202 current usage data for the plurality of central processing unit components.

Figure 4:
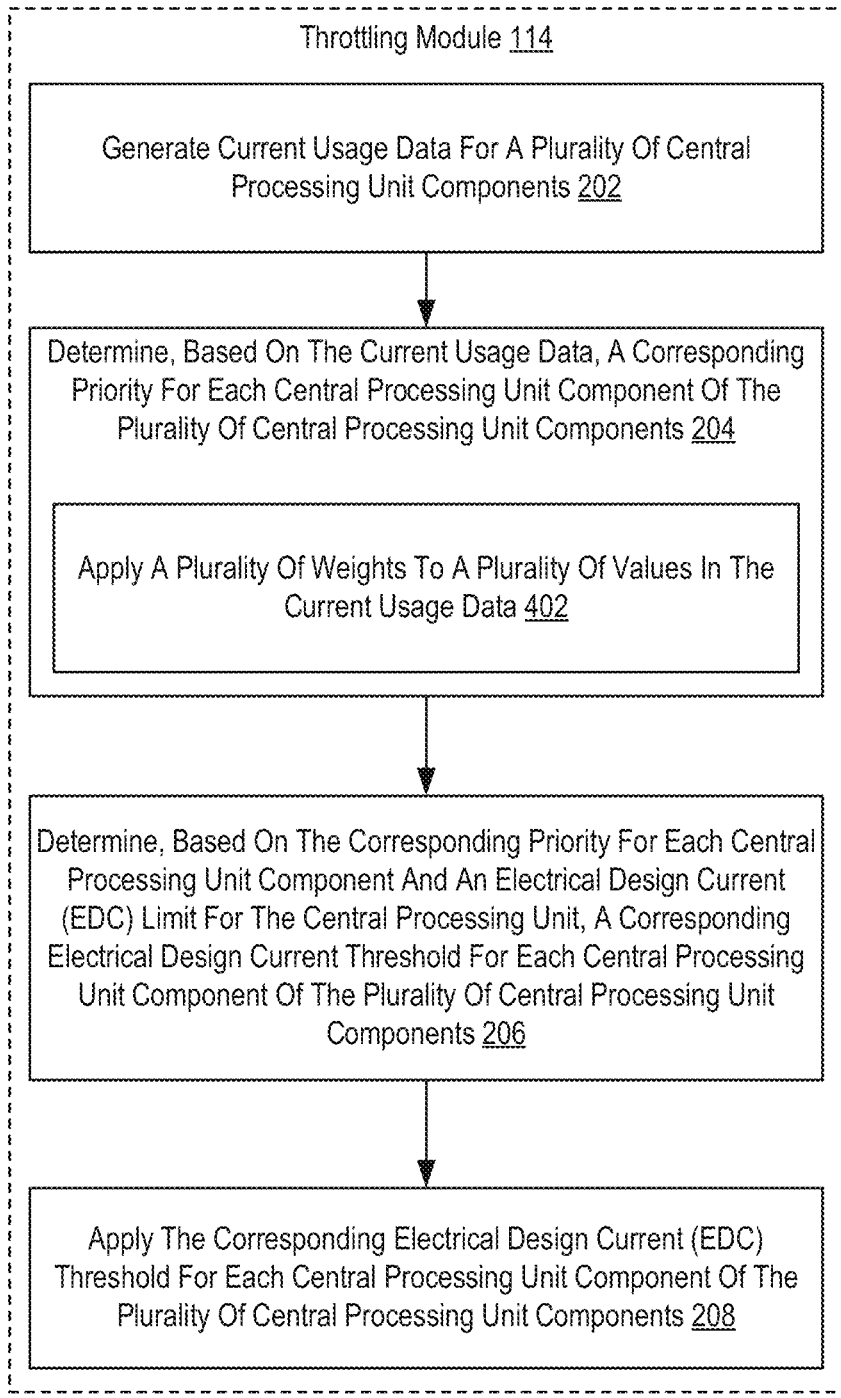
FIG. 4 is a flowchart of an example method for electrical design current throttling according to some embodiments.

For further explanation, FIG. 4 sets forth a flow chart illustrating an exemplary method for electrical design current throttling that includes generating 202 (e.g., by a throttling module 114) current usage data for a plurality of central processing unit components; determining 204 (e.g., by the throttling module 114), based on the current usage data, a corresponding priority for each central processing unit of the central processing unit components; determining 206 (e.g., by the throttling module 114), based on the corresponding priority for each central processing unit component and an electrical design current limit for the central processing unit, a corresponding electrical design current threshold for each central processing unit component of the plurality of central processing unit components; and applying 208 the corresponding electrical design current threshold for each central processing unit component of the plurality of central processing unit components.

FIG. 4 differs from FIG. 2 in that determining 204, based on the current usage data, a corresponding priority for each central processing unit of the central processing unit components includes applying 402 a plurality of weights to a plurality of values in the current usage data. In some embodiments, the plurality of weights are defined on a per-component, per-operation basis. In other words, each operation that can be indicated for each type of component includes a different weight. For example, for a cache component, cache reads are associated with a first weight, cache writes are associated with a second weight, etc. As another example, for a core component, each type of instruction issued by the core and indicated in the current usage data corresponds to a different weight. In some embodiments, for weights applied to values indicating the number of times a particular component reaches its electrical design current threshold, each weight differs on a per-component basis. For example, the number of times a core component reaches its electrical design current threshold is associated with a first threshold, the number of times an L2 cache component reaches its electrical design current threshold is associated with a second threshold, the number of times an L3 cache component reaches its electrical design current threshold is associated with a third threshold, etc.

Figure 5:
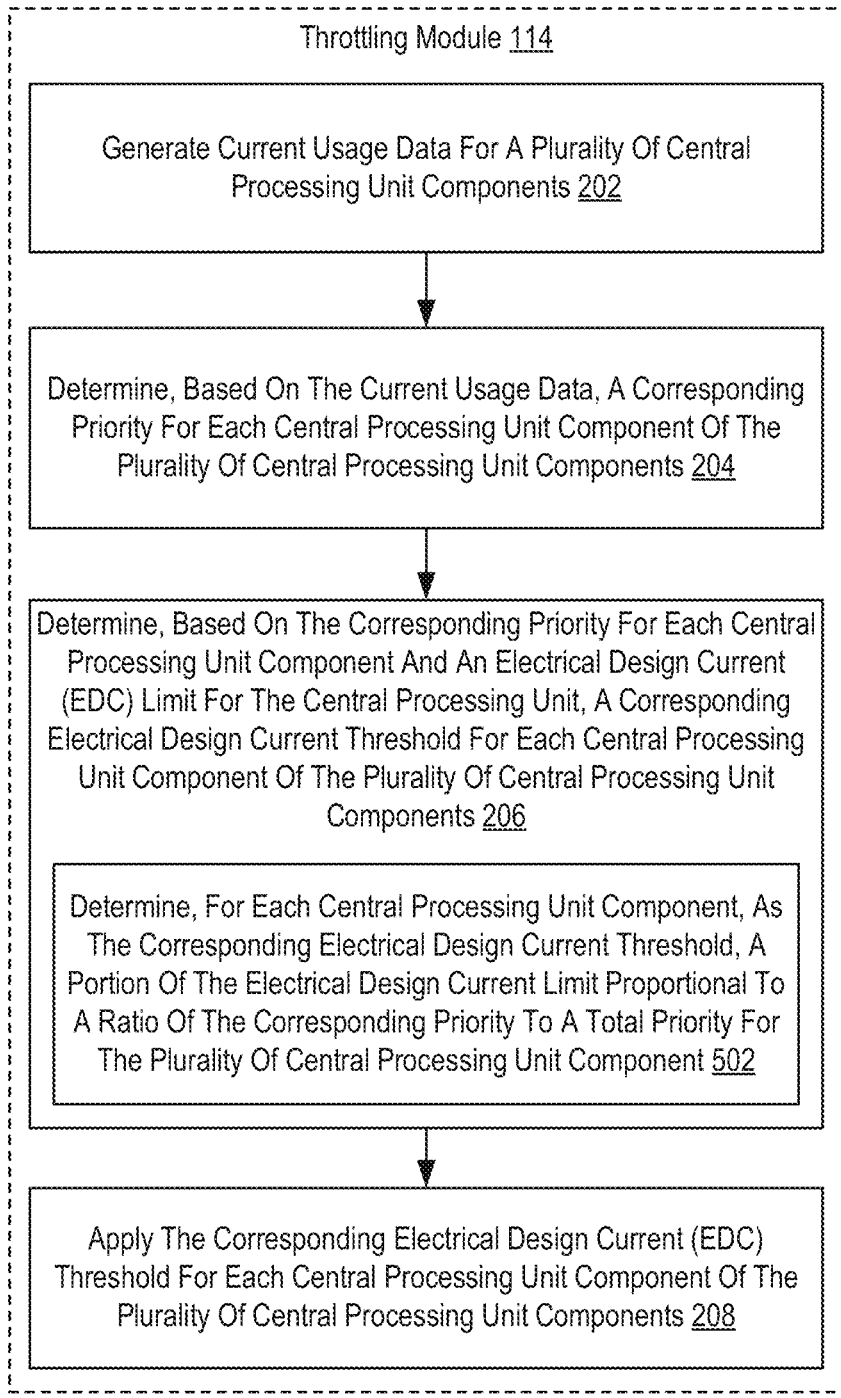
FIG. 5 is a flowchart of an example method for electrical design current throttling according to some embodiments.

For further explanation, FIG. 5 sets forth a flow chart illustrating an exemplary method for electrical design current throttling that includes generating 202 (e.g., by a throttling module 114) current usage data for a plurality of central processing unit components; determining 204 (e.g., by the throttling module 114), based on the current usage data, a corresponding priority for each central processing unit of the central processing unit components; determining 206 (e.g., by the throttling module 114), based on the corresponding priority for each central processing unit component and an electrical design current limit for the central processing unit, a corresponding electrical design current threshold for each central processing unit component of the plurality of central processing unit components; and applying 208 the corresponding electrical design current threshold for each central processing unit component of the plurality of central processing unit components.

FIG. 5 differs from FIG. 2 in that determining 206, based on the corresponding priority for each central processing unit component and an electrical design current limit for the central processing unit, a corresponding electrical design current threshold for each central processing unit component of the plurality of central processing unit components includes determining 502 (e.g., by the throttling module 114), for each central processing unit component, as the corresponding electrical design current threshold, a portion of the electrical design current limit proportional to a ratio of the corresponding priority to a total priority for the plurality of central processing unit components.

The total priority is determined as a sum of all priorities for all components. For example, assume that, for a given component, the ratio of the priority of the given component to the total priority is 0.25. In other words, assuming a total priority indicated as "total_priority," the ratio for the given component is (priority/total_priority)=0.25. Assuming an electrical design current limit "edc_limit," the electrical design current threshold for the given component is then determined as 0.25*edc_limit. Thus, each component is allocated a proportional portion of the total electrical design current limit based on the workload of that component (indicated by the number and type of operations performed by that component) and the sufficiency of the previously determined electrical design current threshold (indicated by the number of times the component reached its electrical design current threshold). Where a particular core is idle (e.g., indicated as idle in the current usage data), the electrical design current threshold is determined as a predefined (e.g., low relative to other thresholds) threshold.

In view of the explanations set forth above, readers will recognize that the benefits of electrical design current throttling include:
  Improved performance of a computing system by allocating electrical design current thresholds across components based on current workloads, thereby reducing the likelihood of electrical design current limit for a voltage regulator being reached and causing performance degradation.
  Improved performance of a computing system by reduced performance degradation in a particular component reaching its electrical design current threshold when compared to performance degradation caused by the central processing unit reaching the electrical design current limit of the voltage regulator.

Exemplary embodiments of the present disclosure are described largely in the context of a fully functional computer system for electrical design current throttling. Readers of skill in the art will recognize, however, that the present disclosure also can be embodied in a computer program product disposed upon computer readable storage media for use with any suitable data processing system. Such computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of electrical design current throttling, the method comprising:
applying an electrical design current (EDC) limit and an EDC threshold, from a plurality of EDC thresholds, to each central processing unit component of a plurality of central processing unit components responsive to a corresponding priority of each central processing unit component, the priority of a central processing unit component responsive to a central processing unit component's current usage data.

2. The method of claim 1, further comprising:
generating the current usage data for the plurality of central processing unit components;
determining, based on the current usage data, the corresponding priority for each central processing unit component of the plurality of central processing unit components; and
determining, based on the corresponding priority for each central processing unit component and the (EDC) limit for the central processing unit, the corresponding EDC threshold for each central processing unit component of the plurality of central processing unit components.

3. The method of claim 2, wherein generating the current usage data comprises receiving, from a plurality of counters coupled to the plurality of central processing unit components, a plurality of values.

4. The method of claim 2, wherein the current usage data comprises, for each central processing unit component, a current consumption value for a time window and an electrical design current throttling value for the time window.

5. The method of claim 2, wherein determining the corresponding priority for each central processing unit of the plurality of central processing unit components comprises applying a plurality of weights to a plurality of values in the current usage data.

6. The method of claim 5, wherein each weight of the plurality of weights is based on a type of central processing unit component associated with a corresponding value of the plurality of values and/or an executed operation associated with the corresponding value of the plurality of values.

7. The method of claim 2, wherein determining the corresponding electrical design current threshold for each central processing unit component comprises determining, for each central processing unit component, as the corresponding electrical design current threshold, a portion of the electrical design current limit proportional to a ratio of the corresponding priority to a total priority for the plurality of central processing unit component.

8. The method of claim 1, wherein the plurality of central processing unit components comprise one or more cores of the central processing unit, one or more caches of the central processing unit, and/or one or more core complexes of the central processing unit.

9. An apparatus for electrical design current throttling, the apparatus configured to perform steps comprising:
generating current usage data for a plurality of central processing unit components;
determining, based on the current usage data, a corresponding priority for each central processing unit component of the plurality of central processing unit components;
determining, based on the corresponding priority for each central processing unit component and an electrical design current (EDC) limit for the central processing unit, a corresponding electrical design current threshold for each central processing unit component of the plurality of central processing unit components; and
applying the corresponding electrical design current (EDC) threshold to each central processing unit component of the plurality of central processing unit components.

10. The apparatus of claim 9, wherein generating the current usage data comprises receiving, from a plurality of counters coupled to the plurality of central processing unit components, a plurality of values.

11. The apparatus of claim 9, wherein the current usage data comprises, for each central processing unit component, a current consumption value for a time window and an electrical design current throttling value for the time window.

12. The apparatus of claim 9, wherein determining the corresponding priority for each central processing unit of the plurality of central processing unit components comprises applying a plurality of weights to a plurality of values in the current usage data.

13. The apparatus of claim 12, wherein each weight of the plurality of weights is based on a type of central processing unit component associated with a corresponding value of the plurality of values and/or an executed operation associated with the corresponding value of the plurality of values.

14. The apparatus of claim 9, wherein determining the corresponding electrical design current threshold for each central processing unit component comprises determining, for each central processing unit component, as the corresponding electrical design current threshold, a portion of the electrical design current limit proportional to a ratio of the corresponding priority to a total priority for the plurality of central processing unit component.

15. The apparatus of claim 9, wherein the plurality of central processing unit components comprise one or more cores of the central processing unit, one or more caches of the central processing unit, and/or one or more core complexes of the central processing unit.

16. A computer program product disposed upon a non-transitory computer readable medium, the computer program product comprising computer program instructions for electrical design current throttling that, when executed, cause a computer system to perform steps comprising:
generating current usage data for a plurality of central processing unit components;
determining, based on the current usage data, a corresponding priority for each central processing unit component of the plurality of central processing unit components;
determining, based on the corresponding priority for each central processing unit component and an electrical design current (EDC) limit for the central processing unit, a corresponding electrical design current threshold for each central processing unit component of the plurality of central processing unit components; and
applying the corresponding electrical design current (EDC) threshold to each central processing unit component of the plurality of central processing unit components.

17. The computer program product of claim 16, wherein generating the current usage data comprises receiving, from a plurality of counters coupled to the plurality of central processing unit components, a plurality of values.

18. The computer program product of claim 16, wherein the current usage data comprises, for each central processing unit component, a current consumption value for a time window and an electrical design current throttling value for the time window.

19. The computer program product of claim 16, wherein determining the corresponding priority for each central processing unit of the plurality of central processing unit components comprises applying a plurality of weights to a plurality of values in the current usage data.

20. The computer program product of claim 19, wherein each weight of the plurality of weights is based on a type of central processing unit component associated with a corresponding value of the plurality of values and/or an executed operation associated with the corresponding value of the plurality of values.

21. The computer program product of claim 16, wherein determining the corresponding electrical design current threshold for each central processing unit component comprises determining, for each central processing unit component, as the corresponding electrical design current threshold, a portion of the electrical design current limit proportional to a ratio of the corresponding priority to a total priority for the plurality of central processing unit component.

* * * * *